Aug. 6, 1957  J. J. SPICER, JR., ET AL  2,802,075
VEHICLE TURN INDICATING APPARATUS
Filed March 16, 1955.

INVENTOR
John J. Spicer, Jr.
William Edward Berk, Jr.
By: Synnestvedt & Lechner
ATTORNEYS Aug. 6, 1957   J. J. SPICER, JR., ET AL   2,802,075
VEHICLE TURN INDICATING APPARATUS
Filed March 16, 1955   2 Sheets-Sheet 2
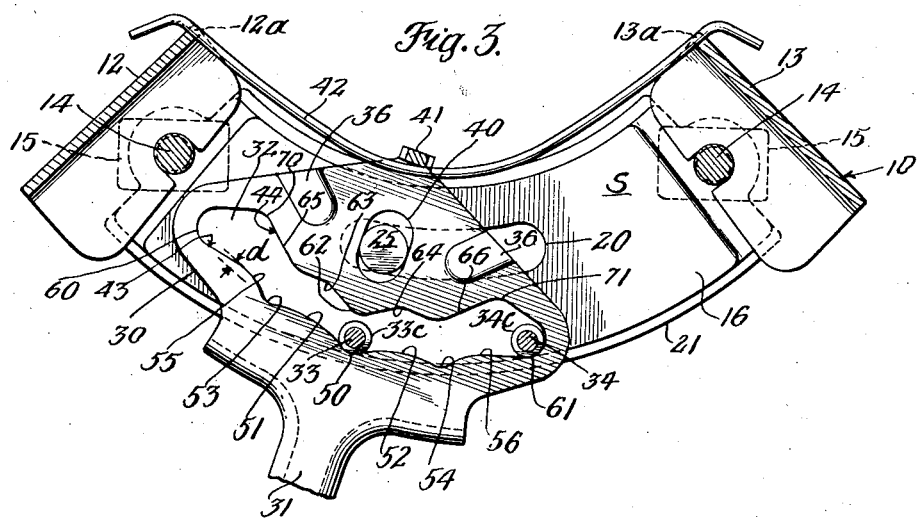
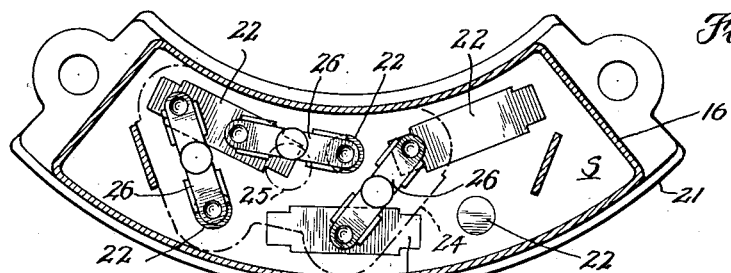
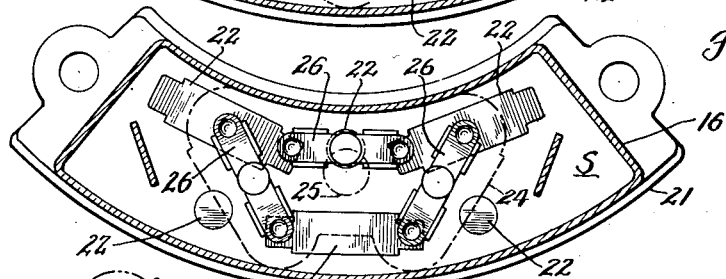
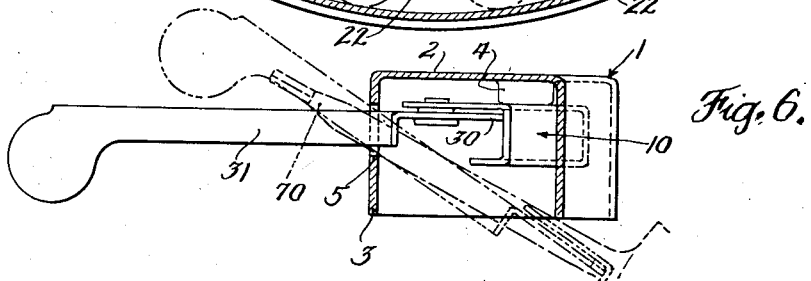
INVENTOR
John J. Spicer, Jr.
William Edward Berk, Jr.
By: Synnestvedt & Lechner
ATTORNEYS

United States Patent Office 2,802,075
Patented Aug. 6, 1957

2,802,075
VEHICLE TURN INDICATING APPARATUS

John J. Spicer, Jr., Philadelphia, Pa., and William Edward Berk, Jr., Detroit, Mich., assignors to United Specialties Company, Philadelphia, Pa., a corporation of Delaware Application March 16, 1955, Serial No. 494,669

6 Claims. (Cl. 200—61.34)

This invention relates in general to vehicle turn indicating equipment and, in particular, relates to means to be actuated by an operator to initiate a turn signal.

Many vehicles such as passenger cars and trucks are provided with mechanism adapted to flash signal lights on the front and rear of the vehicle when a turn is to be made in either the left or right-hand direction. Such mechanism may include in general certain electrical components for the circuits making up the system, a switch for interconnecting circuits to cause the desired flashing, together with mechanical means to be actuated by the driver to operate the switch. The present invention is concerned with the latter mentioned portion of such equipment preferably being adapted to be actuated by the hand of the operator and being of the non-self-cancelling type.

It is an object of the present invention to provide in a vehicle turn indicating system a switch actuating device of relatively simplified construction which is low in cost, positive in action and capable of sustained service.

Another object of the invention is to provide in a vehicle turn indicating system, a switch actuating device having a simplified, yet highly reliable spring and camming arrangement providing for the easy movement of the device to a neutral or to either of two settable or turn indicating positions and for firmly holding the device in any of said positions.

Another object of the invention is to provide for a vehicle turn indicating system, a switch actuating device having parts which can be made by press and stamping operations so that machining is held to a minimum.

Another object of the invention is to provide in a vehicle turn indicating system, a switch actuating device, the components of which are quickly made and fitted together in independent assemblies, the assemblies then being easily connected together to make up the composite switch.

The manner in which the invention is constructed will be apparent from the following description and drawings wherein:

Figure 3 is a plan section on the line 3—3 of Figure 2 showing the disposition of certain parts when the device is in a settable position;

Figure 4 is a plan section of the switch unit as taken on the line 4—4 of Figure 2, the carrier of the switch being shown in dot and dash lines in a position corresponding to the position of Figure 3;

Figure 5 is a plan section similar to Figure 4 showing the carrier in neutral position; and Figure 6 is a more or less diagrammatic view illustrating a manner of assembling the device.

Figure 1:
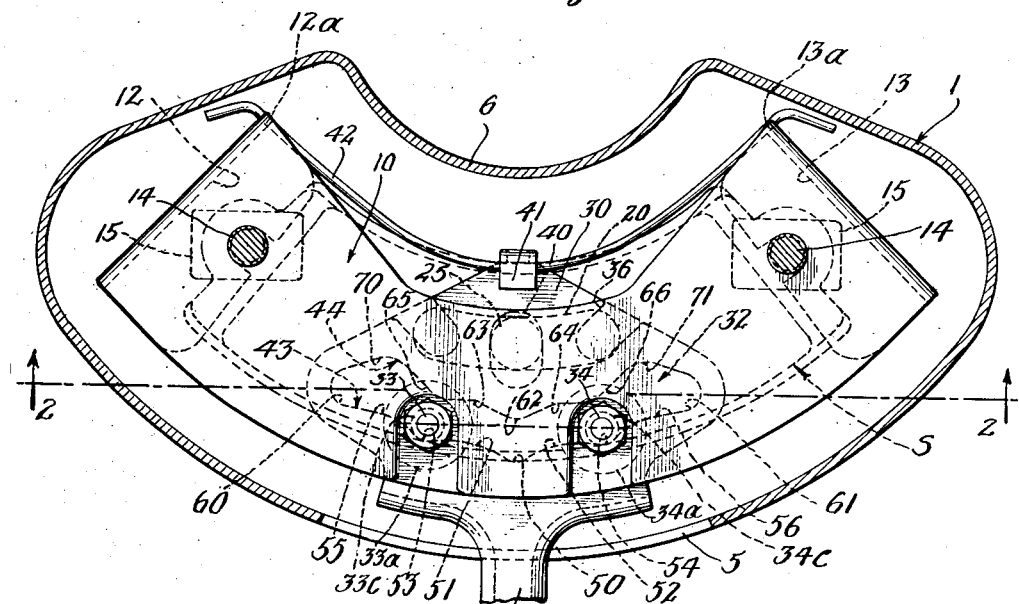
Figure 1 is a plan section taken on the line 1—1 of Figure 2 showing the disposition of certain parts when the device is in a neutral position.
Figure 2:
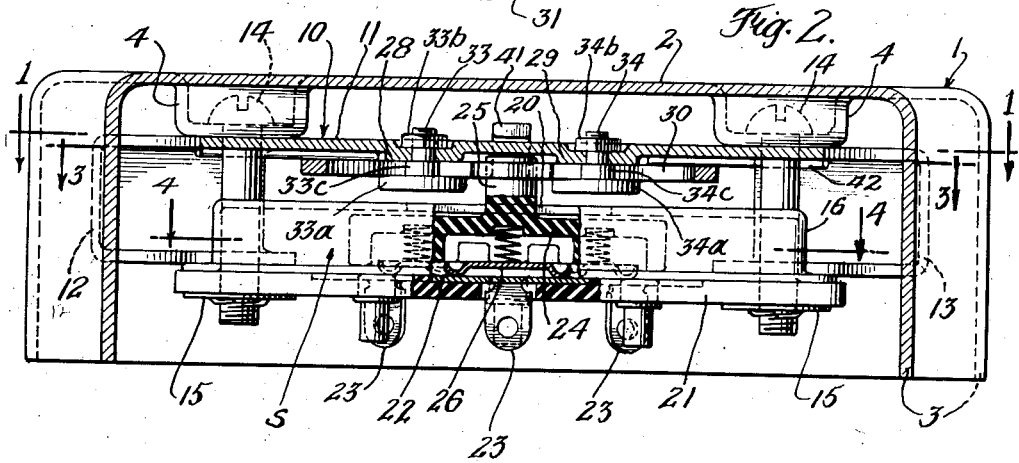
Figure 2 is a sectional elevation as taken on the line 2—2 of Figure 1.

In Figure 1 the numeral 1 designates a housing which, in plan, is somewhat arcuate in shape and which, as seen in Figure 2, has a top portion 2 and a side or skirt portion generally designated by the numerals 3—3. The top portion has recesses 4—4, as seen in Figure 2, and the side is provided with a slot 5. The portion 6 of the housing is shaped so that the housing can be conveniently attached to the steering post of a vehicle by means not shown.

The housing 1 mounts a bracket 10 which, as seen in Figure 1, is arcuate in shape and has a top portion 11 (Figure 2) abutting the recesses 4—4. The opposite ends of the bracket are each bent into an L form as is indicated by the numerals 12 and 13. The feet of the L's each abut a switch generally designated by S and the screws 14—14 inserted in appropriate apertures in the bracket 10, the top portion 11, the switch S, and in the feet of the L's, together with the nuts 15—15, hold the bracket and switch firm on the housing.

A switch useable with the invention herein may take a variety of forms, for example, a switch such as disclosed in copending application of John J. Spicer, Jr., Serial No. 328,095, filed December 26, 1952, entitled Switch for an Automobile Turn Indicating System, and assigned to the assignee of the present invention, now Patent 2,714,140, issued July 26, 1955. This switch is fully described in that patent and need only be briefly alluded to here.

As seen in Figure 3, the switch has a generally arcuately-shaped housing 16 which is provided with a slot 20. As seen in Figure 2, the housing is mounted on a base 21 having a plurality of fixed terminals which, on one side, are flush with the base as indicated by the numerals 22—22 in Figures 2, 4 and 5. On the other side of the base the terminals are adapted, as indicated by 23—23 in Figure 2, to be connected to various of the turn signal circuits on the motor vehicle. On the inside of the housing 16 is disposed a contact carrier 24, which has an operating stud 25 extending upwardly through the slot 20. The carrier mounts a plurality of bridging contacts designated by 26—26 in Figure 2.

The carrier is adapted to be moved by mechanism, to be explained later, from a neutral position as shown in Figure 5 to settable positions on the left or right-hand side of neutral, for example, the settable position on the left-hand side shown in Figure 4. When the carrier is in the neutral position, the bridging contact interconnects certain of the fixed terminals and in either of the settable positions, certain other of the fixed terminals are interconnected so that the turn signals are flashed in the desired manner.

The mechanism for actuating the switch and moving the carrier will be explained following.

As seen in Figures 1 and 2, a generally diamond-shaped member 30 is disposed on the underside of the top portion 11 of the bracket 10. As will be apparent, the member 30 bears against the bosses 28 and 29 so that for the most part, it is slightly spaced apart from the underside of the portion 11. This member is shown to be integral with a lever 31, which is adapted to be moved by the vehicle operator. The member 30 has a generally V-shaped slot 32 in which are disposed the studs 33 and 34. These studs have heads 33a and 34a, which are of a diameter larger than the slot 32 and are pulled against the underside of the member 30 by the nuts 33b and 34b threaded on the ends of the studs in a manner to provide for the member 30 to be slidable with respect to the bracket. The portions 33c and 34c on the studs are disposed within the slot 32. The member 30 has bosses 35 and 36, which may ride on the underside of the portion 11 and prevent any rocking tendency of the member as mounted on the bosses 28 and 29. While we have shown the studs 33 and 34 as having threads and fastened by nuts 33b and 34b, the ends of the studs may be arranged to be staked over in rivet-like fashion.

As best seen in Figure 3, the member 30 has a slot 40, in which is disposed a stud 25 of the switch S. Movement of the member, of course, causes movement of the stud and, therefore, positions or moves the carrier 24 of the switch.

As best seen in Figure 1, the member 30 has a hook-like extension 41 which is interconnected to a spring 42, the ends of which bear in grooves in the legs 12 and 13 as indicated at 12a and 13a. The force developed by the spring 42 pulls the member 30 (upwardly as viewed in Figure 1) so that the portions 33c and 34c of the studs are firm against the side 43 of the slot 32.

The side 43 and the side 44 of the slot 32 are provided with a plurality of detents and curved surfaces, certain of which are engageable with the portions 33c and 34c and cooperate with the spring 42 in providing for movement of the member 30 and the locking thereof in any of the settable positions and in the neutral position. As will appear later, the member 30 functions as a cam, having the side 43 as a cam track which cooperates with the portions or cam abutments 33c and 34c. In some instances, the side 44 may function as a cam track.

The side 43 has a center detent 50, a pair of curved surfaces 51 and 52 symmetrically arranged on either side of the detent, and joining another pair of detents 53 and 54. Another pair of curved surfaces 55 and 56 are symmetrically arranged respectively on either side of the detents 53 and 54 and at their outer extremities, join detents 60 and 61.

The side 44 has a curved surface 62 arranged generally opposite to the detent 50 and joining the depressions 63 and 64. On either side of the depressions 63 and 64 are curved surfaces 65 and 66 which, at their extreme ends, join with depressions 70 and 71.

As seen in Figure 1, the cam abutments 33c and 34c are disposed in detents 53 and 54 and the action of the spring 42 pulls the detents into firm engagement with the abutments. This is the neutral position of the member 30 or of the carrier of the switch S. When a left or right-hand turn is to be made, the operator moves the lever 31. If the lever is moved to the left, as viewed in Figures 1 and 3, the following action takes place.

As the lever is moved, the member 30 tends to pivot or move about the abutment 33c, in the sense that the detent 54 moves away from the abutment 34c, while at the same time, the left-hand part of the surface 51 begins to move past the abutment 33c. This action is opposed by spring 42 and continues until the topmost part of the surface 51 is in line with the abutment 33c. At this time, the action of the spring, in pulling upwardly on the member 30, causes the right-and part of the surface 51 to ride past the abutment 33c so that the detents 50 and 61 are pulled into engagement with the respective abutments. This is shown in Figure 3. The movement of the member 30, of course, causes movement of the carrier 24 to this settable or turn indicating position.

Depending upon the manner in which the operator moves the lever for the above operation, the right-hand part of surface 66 may touch the abutment 34c. The shape of the surface 66 is such as to serve as a guide for the motion of member 30 and the interengagement will not cause binding.

After a turn is completed and it is desired to move the switch back to neutral, the lever is moved to the right as seen in Figure 3.

The member 30 "pivots" or moves about the abutment 34c in the sense that the detent 50 moves away from the abutment 33c, while at the same time, the right-hand part of surface 56 tends to move past the abutment 34c. This action is opposed by spring 42 and continues until the topmost part of the surface 56 is in line with the abutment 34c. At this time the action of the spring, in pulling upwardly on the member 30, causes the left-hand part of surface 56 to ride past the abutment 33c so that the detents 54 and 53 are pulled into engagement with the respective abutments. Depending upon the manner in which the operator moves the lever for this operation, the left-hand part of surface 62 may engage the abutment 33c and the surface is shaped so as to serve as a guide and not cause binding.

Similar operative conditions occur when the lever 31 and member 30 are moved from the neutral position to the right-hand side.

One of the principal advantages of the above is the simplicity of arrangement for accomplishing the intended purpose in the sense of the cooperative action between the abutments and the cam track and in the sense of the cooperative action between these elements and the spring.

It will be apparent when the member 30 is moved from the neutral position to a settable position (or vice versa) that for the part of the movement resisted by the spring, only one abutment is engaged with the track. This is important in the functioning of the device inasmuch as the drag forces will be much less than if two abutments were engaged.

Also, proper detenting can be obtained by making the distance separating the topmost part of an arcuate surface and the bottom of an adjacent detent (for example, the distance d in Figure 3) relatively small and using a large spring force; thus, when the member 30 is in a neutral position or a settable position, it is firmly held. Despite the large spring force, the lever moving the member 30 is easily actuated due to the single engagement mentioned above and because of the smallness of distance d.

In general, another of the advantages of the invention is that the composite parts can be made by drawing and stamping operations. This is important from the standpoint of savings in material and in time required to make a switch, both of these factors contributing to lower cost.

Another advantage is that the components are constructed to be easily assembled. For example, the housing may be made up in one piece, the lever 31 and mechanism 30 and the bracket may be assembled as a unit, and the switch S also be assembled as a unit. These components may then be easily fitted together as is illustrated in Figure 6. There the lever 31 is turned flatwise and inserted in the slot 5 in the housing until reaching approximately the position shown at 70. Then by turning the assembly 90°, it may be fitted into the housing. The switch S is put on the bracket and with the fixing of screws 14—14, the switch is completely assembled.

We claim:

1. In vehicle turn signal equipment: a bracket; switch actuating mechanism slidably mounted on said bracket and positionable to a neutral position and two settable positions; two cam abutments fixedly secured to said bracket; cam track means arranged on said switch actuating mechanism and cooperating with said abutments; and spring means connected between said bracket and said switch actuating mechanism and urging said track means and said abutments into engagement, the spring means, said track means and said abutments being arranged whereby during a portion of the time the switch actuating mechanism is moved from a neutral to a settable position, one abutment engages the track means while the other abutment is disengaged from the track means.

2. In vehicle turn signal equipment: a bracket; a switch actuating mechanism slidably mounted on said bracket and positionable to a neutral position and two settable positions; two cam abutments fixedly secured to said bracket; a generally V-shaped cam track arranged on said switch actuating mechanism having a plurality of detents arranged to cooperate with said abutments whereby the switch actuating mechanism can be maintained in any of said positions; and a rod-like spring connected between said bracket and said switch actuating mechanism and urging the cam track and the abutments into engagement.

3. In vehicle turn signal equipment: a lever or the like adapted to be moved by the vehicle operator; a switch positioning member connected with the lever including means for connecting the member to a switch; and a cam track on the member having a first detent, a pair of arcuate surfaces respectively extending symmetrically away from opposite ends of said detent, second and third detents symmetrically disposed on opposite sides of said first detent and joined with the extremities of said surfaces, a second pair of arcuate surfaces respectively extending symmetrically away from opposite ends of said second and third detents, fourth and fifth detents symmetrically disposed on opposite sides of said first detent and joined respectively with the extreme ends of said second pair of arcuate surfaces.

4. In vehicle turn signal equipment: a bracket element; a switch actuating element slidably mounted on said bracket and positionable to a neutral position and two settable positions; two cam abutments fixedly secured to one of said elements; cam track means arranged on the other of said elements and cooperating with said abutments, the track means and the abutments being arranged whereby during a portion of the time the actuating element is moved from a neutral to a settable position, one abutment is engaged with the track means while the other abutment is disengaged from the track means; and spring means connected between said bracket element and said actuating element and urging said track means and said abutments into engagement.

5. In vehicle turn signal equipment: a bracket; a switch mounted on said bracket and having a movable carrier adapted to have a neutral and two settable positions; two cam abutments fixedly secured to said bracket; a switch actuating mechanism connected with said carrier and adapted to move the carrier to any of said positions and having a generally V-shaped cam track adapted to cooperate with said abutments, the cam track having a detent located at the apex of the V, a pair of detents located substantially at the extremities of the V and a second pair of detents respectively located intermediate the above-mentioned detents; and spring means connected between said bracket and said actuating mechanism and operating to urge said cam track and said abutments into engagement.

6. A vehicle turn signal device comprising: a generally arcuately-shaped bracket, the ends of which are upturned to form an L, the feet of the L respectively extending inwardly of the bracket; a generally arcuately-shaped switch, the opposite ends of which are respectively mounted on said feet, the switch having a movable member provided with an operating stud; a switch actuating mechanism movably mounted on said bracket and having an operating lever and a switch positioning member; a pair of spaced-apart abutments connected with said bracket; a first slot in said positioning member having said stud disposed therein; a second slot generally V-shaped on said positioning member having said abutments disposed therein, the slot having a plurality of detents arranged to cooperate with said abutments whereby the member can be maintained in a neutral position or alternatively in either of two settable positions; a hook on said positioning member; and a rod-like spring bearing on the ends of the bracket and connected to said hook whereby to urge said V-shaped slot and said abutments into engagement.

References Cited in the file of this patent
UNITED STATES PATENTS

| | | |
|---|---|---|
| 2,276,413 | Moore | Mar. 17, 1942 |
| 2,642,505 | Hept | June 16, 1953 |
| 2,722,577 | Barcus | Nov. 1, 1955 |
| 2,728,825 | Lincoln et al. | Dec. 27, 1955 |